Aug. 30, 1966 T. L. HANSON ET AL 3,269,138
ICE MAKING APPARATUS FOR BEVERAGE VENDING MACHINE
Filed Oct. 2, 1964 5 Sheets-Sheet 1

INVENTORS.
Theodore L. Hanson
Stewart L. Black
James F. Ferguson
BY
Hovey, Schmidt, Johnson & Hovey.
ATTORNEYS.

Fig.2.

INVENTORS.
Theodore L. Hanson
Stewart L. Black
BY James F. Ferguson
Hovey, Schmidt, Johnson & Hovey
ATTORNEYS.

Fig.3.

Aug. 30, 1966  T. L. HANSON ET AL  3,269,138
ICE MAKING APPARATUS FOR BEVERAGE VENDING MACHINE
Filed Oct. 2, 1964  5 Sheets-Sheet 4

INVENTORS.
Theodore L. Hanson
Stewart L. Black
BY James F. Ferguson

Hovey, Schmidt, Johnson & Hovey
ATTORNEYS.

Aug. 30, 1966  T. L. HANSON ET AL  3,269,138
ICE MAKING APPARATUS FOR BEVERAGE VENDING MACHINE
Filed Oct. 2, 1964  5 Sheets-Sheet 5

INVENTORS.
Theodore L. Hanson
Stewart L. Black
BY James F. Ferguson

Hovey, Schmidt, Johnson & Hovey
ATTORNEYS.

United States Patent Office 3,269,138
Patented August 30, 1966

3,269,138
ICE MAKING APPARATUS FOR BEVERAGE
VENDING MACHINE
Theodore L. Hanson, Kansas City, Stewart L. Black, Lee's Summit, and James F. Ferguson, Independence, Mo., assignors to The Vendo Company, Kansas City, Mo., a corporation of Missouri
Filed Oct. 2, 1964, Ser. No. 401,210
20 Claims. (Cl. 62—135)

This invention relates to apparatus for producing ice in particulate form, and particularly to mechanism especially adapted for the production of ice in small chunk form suitable for use in beverages dispensed from a vending machine.

For many years it has been conventional practice to provide chipped ice in soft drinks and other similar beverages which are served over the counter in glasses or cups. The chipped ice improves the palatability of the drink because it keeps the beverage cold throughout the time period required for the person to consume the drink, regardless of ambient temperature. A recent development in the vending machine field has been the provision of ice making equipment in beverage vending machines for delivering a quantity of flaked or chipped ice to each beverage cup to provide a drink substantially equivalent to beverages sold over the counter. The ice making and discharging apparatus added to vending machines of the type designed to dispense individual beverages in a suitable cup or other expendable container, has necessarily substantially increased the basic cost of this line of equipment. However, in view of the competitive situation which exists in the production and sale of post and premix beverage vending machines, and the fact that improved products are dispensed from the mechanism when ice is included in the beverage, it has become incumbent on manufacturers of these machines to include an ice making and dispensing unit even though the cost of the machine has been increased to a certain degree. However, it is to be recognized that it is desirable to provide a particulate ice making unit for the beverage vending machines of lowest practicable cost consistent with production of satisfactory ice.

In one commonly employed ice making unit for vending machines, a generally cylindrical evaporator is employed whereby water directed into the interior of the evaporator is frozen on the inner cylindrical wall surface thereof and is then scraped from the wall and delivered to a collecting hopper in response to rotation of an auger coaxial with the evaporator. Although these units are being used with a certain degree of success, they are inherently expensive because of the relatively large motor required to drive the screw which must be rotated with sufficient force to scrape the ice directly from the inner face of the evaporator, and to force the flaked ice into a suitable collector. Furthermore, the product formed in ice makers of this type is normally in flaked or shaved condition, making it more difficult to maintain the ice in particulate form without melting and joinder of individual flakes into large pieces which are not only difficultly removable from the hopper during an ice dispensing cycle, but also result in an undesirable type of ice for delivery to the beverage cup.

It is therefore the primary object of the present invention to provide apparatus for making particulate ice, which is of a size adapting the same to be mounted in the cabinets of conventional post and premix beverage vending machines, and which not only is capable of producing an ice of superior quality to that made in the auger type ice makers referred to above, but which also may be manufactured at a significantly lower price than the units heretofore used.

Another very important object of the invention is to provide ice making apparatus for a beverage vending machine wherein is included a cylindrical evaporator which is maintained at least partially immersed in a quantity of the water to be frozen whereby ice is not only formed on the inner surface of the evaporator in disposition to be sequentially removed therefrom, broken into particulate form and directed into a storage compartment, but ice also forms on the outer surface of the evaporator to thereby pre-cool the quantity of water in which the evaporator is immersed. This pre-cooled water is thus adapted for use as the liquid to be carbonated and delivered to the beverage cup in conjunction with a selected flavoring syrup. The necessity of providing separate apparatus for pre-cooling the beverage make-up water is therefore completely obviated.

It is a further important object of the invention to provide ice making apparatus for a beverage vending machine which is capable of producing ice in particulate chunk form rather than flakes or chips, so that the ice will last longer in the beverage, has less tendency to jam and agglomerate in the hopper of the ice making apparatus, and is substantially more resistant to melting in the storage compartment therefor during those periods when beverages are not being dispensed from the vending machine.

It is a further very important object of the invention to provide ice making apparatus for a beverage vending machine which is less expensive than previously used equipment because of the complete elimination of augers or similar components requiring relatively powerful motors for driving the same. In this connection, an important object of the invention is to provide ice making apparatus for the purposes described which employs cyclically operable mechanism which utilizes a cylindrical evaporator on which the ice is formed, but from which the ice is loosened before it is directed to the particulate ice receiving hopper, thereby making it possible to use a relatively low power and therefore significantly less expensive prime mover for shifting the ice from the evaporator to a storage chamber.

Also an important object of the invention is to provide ice making apparatus designed to produce a series of ice sticks within the evaporator, and which are then broken into required particulate form by the simple expedient of shifting all of the sticks longitudinally of the evaporator toward the ice receiving hopper therefor, and causing the individual sticks to change direction during such movement to break the ice into chunks of desired size.

A still further important object of the invention is to provide an ice maker wherein a shiftable ice harvesting element is provided in the evaporator for shifting the sticks of ice toward the particulate ice receiving hopper, and wherein novel drive mechanism is employed for coupling the harvester to an electric motor to effect reciprocation of the harvester to and from the stand-by position thereof notwithstanding rotation of the drive motor in a single direction, to thereby simplify the control components of the ice maker.

A still further important aim of the invention is to provide ice making apparatus wherein the harvester element reciprocable in the cylindrical evaporator is shifted by a double lead screw operably coupled to the drive motor for rotation thereby, and with the grooves of the screw extending in opposite directions so that when a component on the harvester element engages the screw within one of the grooves thereof, the harvester is caused to shift in a direction to displace ice from the evaporator, and when the groove engaging component reaches the end of that groove, it automatically transfers to the other groove twisted in the opposite direction, so that the harvester is returned toward the initial position thereof, and thus making it possible to drive the harvester element in both directions of movement thereof, even though the motor shaft is rotated in only a single direction. It is also an important object of the invention to utilize the shifting of the drive screw relative to the harvester element upon engagement of the latter with any immovable material or object, to discontinue operation of the drive motor, either to prevent damage to the motor when jamming of ice between the evaporator and the harvester element occurs, or when the harvester element has returned to the initial stand-by position thereof.

It is a still further important aim of the invention to provide ice making apparatus as referred to above, wherein the thickness of ice built up on the inner surface of the evaporator can be readily controlled and varied at will by the simple expedient of measuring the thickness of ice built up on the outer surface of the evaporator and providing suitable controls for the refrigeration equipment forming a part of the ice making apparatus, responsive to the thickness of ice built up on the outer face of the evaporator.

Also an important object of the invention is to provide ice making apparatus for a vending machine wherein a conventional gas refrigerant system may be employed, and incorporating novel refrigerant control components permitting cyclic direction of hot refrigerant gas into the evaporator for a desired period of time, to either loosen the ice formed on the inner surface thereof, to facilitate removal of the same to the ice storage compartment and employing a relatively low power motor, or to prevent excessive build-up of ice within the evaporator when there is no further demand for ice because of the ice storage compartment being in a full condition.

Other important objects and advantages of the present ice making apparatus will be described or become apparent in the detailed description and explanation of operation thereof hereunder.

Figure 3:
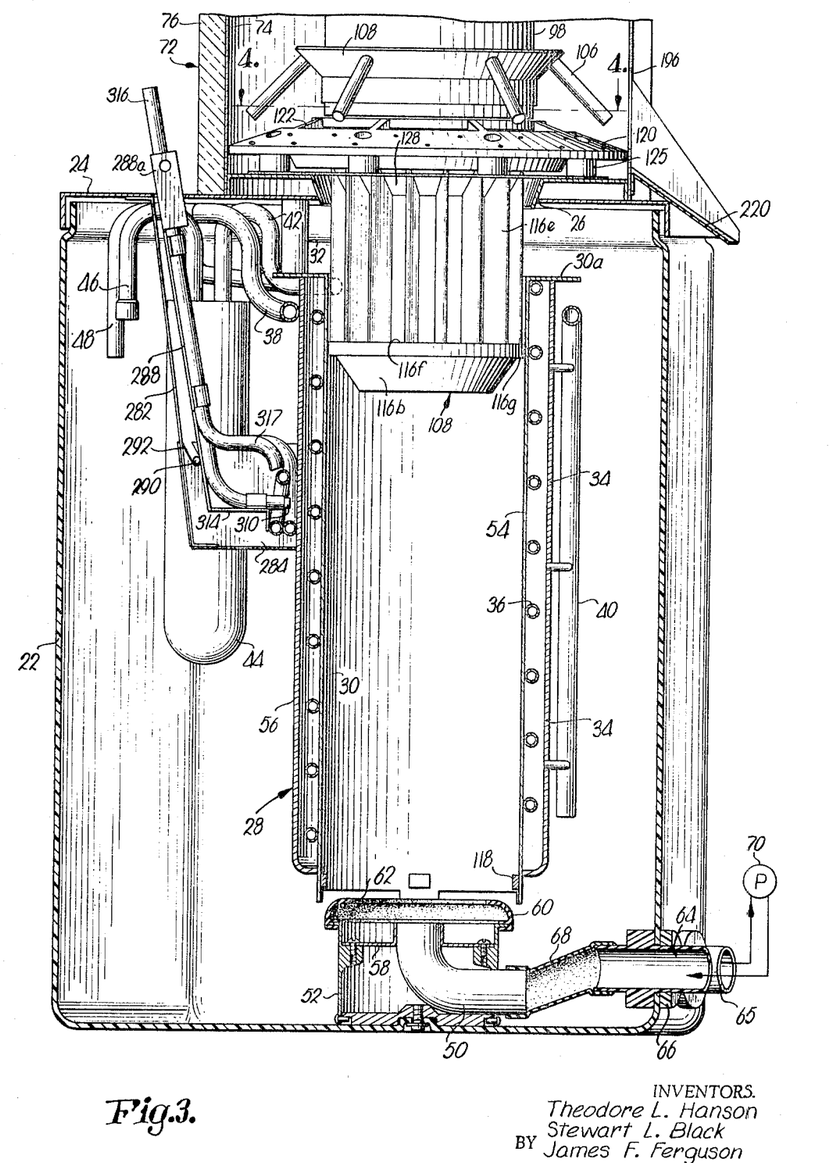
FIG. 3 is a fragmentary, vertical cross-sectional view through the lower ice making portion of the apparatus, also illustrating the harvester element in another position of the same during operation of the ice maker, with the ice breaker, harvester element and agitator member being shown in elevation for purposes of clarity, and taken also substantially along the line 2—2 of FIG. 1.

The ice making apparatus of the present invention is broadly designated by the numeral 20 in the drawings and includes a lower water tank 22 adapted to be suitably suspended within the cabinet of a beverage vending machine adjacent the cup dropping mechanism as well as the beverage delivery station. Plate 24 over the open top of tank 22 is provided with a centrally located, circular opening 26 therein which is aligned with a cylindrical evaporator broadly designated 28 and located within tank 22 as shown in FIG. 3. The inner, upright cylinder 30 of evaporator 28 has an annular flange 30a on the upper margin thereof which is suspended from plate 24 by connectors 32 to thereby provide a support for evaporator 28. The outer cylindrical shell 34 of evaporator 28 located in surrounding relationship to cylinder 30 cooperates with the latter to provide a cylindrical space receiving a hot refrigerant gas coil 36 which communicates with the cylindrical space at the lower extremity thereof. The refrigerant feed line 38 is connected to a manifold 40 communicating with the cylindrical space of evaporator 28 through a series of branch lines as shown in FIG. 3. Hot gas return line 42 joined to the evaporator at the upper extremity thereof, extends into a conventional receiver 44 which in turn has a suction line 46 coupled thereto. The hot gas bypass line 48 is coupled to the upper end of the coil 36.

Means (not shown) is provided for supplying water to tank 22 and for maintaining the level of such water therein at a predetermined point. In order to maintain the temperature of the water in tank 22 at substantially a uniform level, structure is provided for continuously recirculating the water and including an elbow 50 carried by a cylindrical support 52 on the bottom of tank 22 in disposition so that one leg of the elbow, which projects upwardly as shown in FIG. 3, is substantially coaxial with the inner wall surface 54 of cylinder 30, as well as the outer face 56 of shell 34. The annular plate 58 within support 52 engages the upwardly extending leg of elbow 50 to support the same in an upright position. An annular, synthetic rubber sealing member or gasket 60 is mounted on the upper annular surface of support 52 in coaxial relationship with evaporator 28, and provided with a central opening 62 of substantial size as illustrated in FIG. 3, but less than the inner diameter of cylinder 30. Conduit 64 extending through the side wall of tank 22 adjacent the bottom thereof, and carried by waterproof mounting structure 66, is joined to the leg of elbow 50 projecting from structure 52, by a flexible tube 68. Conduit 64 extends from a pump 70 schematically shown in FIG. 3, and which is in turn connected to another conduit 65 communicating with tank 22.

Figure 2:
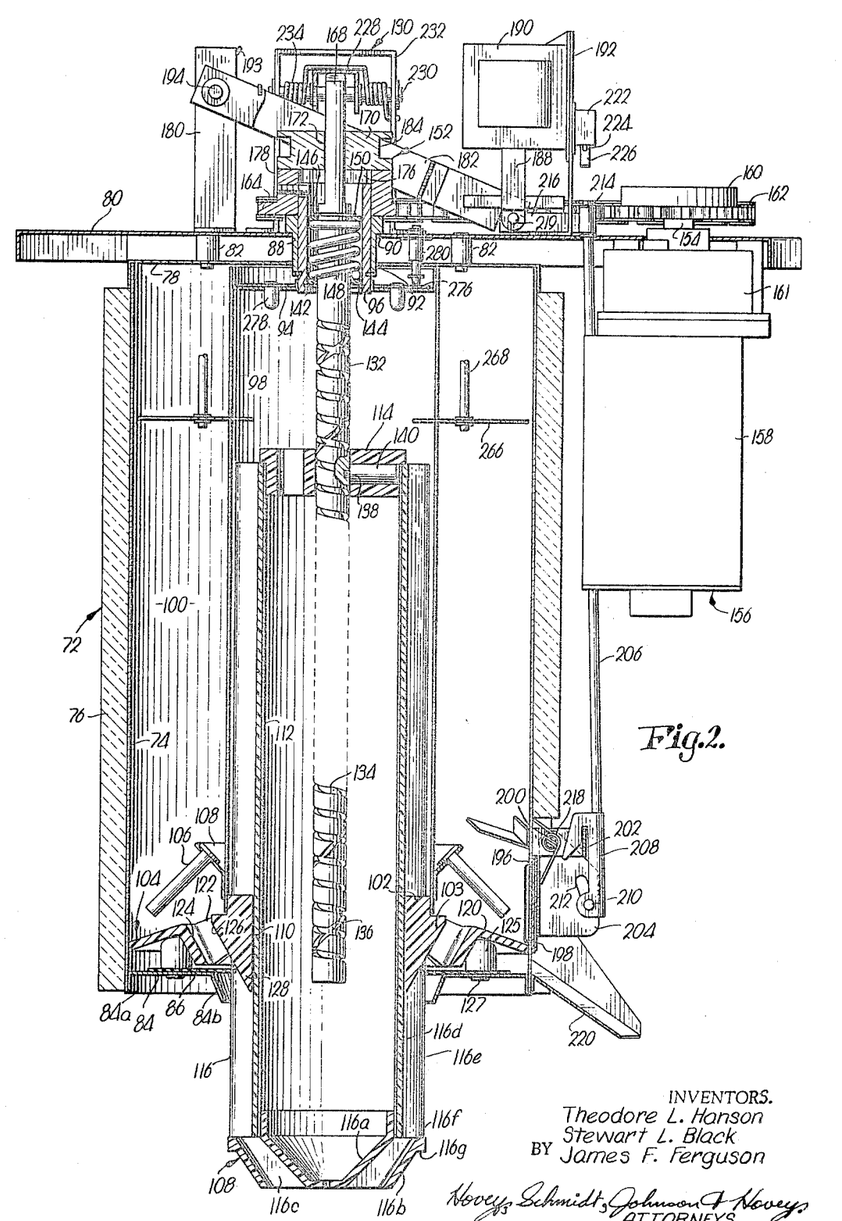
FIG. 2 is a fragmentary, vertical, cross-sectional view of the storage compartment portion of the ice making apparatus, illustrating the harvester element therein in one position of the same, and taken substantially on the line 2—2 of FIG. 1.

The ice storage and dispensing assembly broadly designated 72 in FIGS. 2 and 3, rests above evaporator 28 on the closure plate 24, in coaxial relationship not only with evaporator 28 but also opening 26. Assembly 72 includes an upright cylinder 74 having a cylindrical layer of insulating material 76 therearound and terminating adjacent the annular closure 78 overlying cylinder 74.

A polygonal carrier plate 80 overlying closure 78 and thereby cylinder 74, and spaced from closure 78 by a series of mounting and spacer components 82, serves as means for mounting drive and control mechanism to be described in detail hereinafter.

An annular plate 84 serves as the bottom of assembly 72 as shown in FIGS. 2 and 3, and includes an outer down-turned flange section 84a connected to the inner face of cylinder 74, and a generally conical inner flange section 84b which extends through opening 26 in plate 24 to clear and guide ice sticks as they are pushed upwardly by the ice harvester. The annular gasket 86 (FIG. 2) carried by the upper face of plate 84 in coaxial relationship with conical section 84b, is provided with an inner peripheral margin defining the opening therethrough, of only slightly less diameter than that of opening 26.

A cylindrical bearing 88 (FIG. 2) carried by plate 80 and extending through the opening 90 therein coaxial with the opening defined by conical section 84b of plate 84, also projects through an opening 92 therefor in closure 78. An annular plate 94 secured to the lower extremity of a cylindrical sleeve 96 carried within bearing 88, has an upturned flange on the outer margin thereof which is secured to an agitator cylinder 98 cooperable with the inner face of cylinder 74 to define a particulate ice receiver 100 above annular plate 84. The lower circular extremity of cylinder 98 is rotatably supported by a series of bosses 102 arranged in an annular pattern and integral with a supporting cone 103 of an ice breaker unit broadly designated 104. It is to be noted at this juncture however, that the ice breaker unit 104 is carried by and secured to annular plate 84, so that cylinder 98 may rotate relative to bosses 102 and cone 103 of unit 104.

Rods 106 carried by a conical bracket 108 projecting radially from the lower portion of cylinder 98 are located at an angle with respect to the upper face of plate 84 and serve to agitate particulate ice within receiver 100 during rotation of cylinder 98 and thereby preclude agglomeration of such ice during storage, and to also assure proper delivery of charges of ice from assembly 72 as will be explained.

An ice harvesting element broadly designated 108 is reciprocably positioned within evaporator 28 as well as the cylindrical space defined by cylinder 98, and is adapted to shift through the central bore 110 of ice breaker unit 104.

Harvester element 108 has an elongated central sleeve 112 carrying a generally annular plug 114 at the upper extremity thereof in generally closing relationship thereto, as well as a finned member 116 molder of suitable cold resistant, synthetic resin material and of an effective transverse diameter only slightly less than the transverse dimension of cylinder 30. With reference to FIGS. 2, 3, 4 and 10, it is to be seen that member 116 has a generally conically shaped section 116a telescoped into sleeve 112, and a generally conical outer segment 116b concentric with section 116a and connected thereto by a series of radially projecting, circumferentially spaced webs 116c. The cylindrical main section 116d of member 116 located in close conforming and surrounding relationship to sleeve 112, and equal in length thereto, carries a series of integral, radially projecting, circumferentially spaced, transversely triangular projections 116e which extend toward, but terminate in slightly spaced relationship from the proximal wall surface 54 of cylinder 30. As best illustrated in FIG. 2, the upwardly facing margin of segment 116b presents a relatively narrow, annular surface 116f extending around the circumference of element 108, and presenting interrupted, upwardly facing bearing surfaces between adjacent projections 116e.

In the lowermost position of element 108, the segment 116b thereof engages the flexible gasket 60 and the annular, downwardly facing shoulder 116g of segment 116b engages the annular stop ring 118 on the inner surface 54 of cylinder 30 adjacent the lower extremity thereof as illustrated in FIG. 3.

Figure 4:
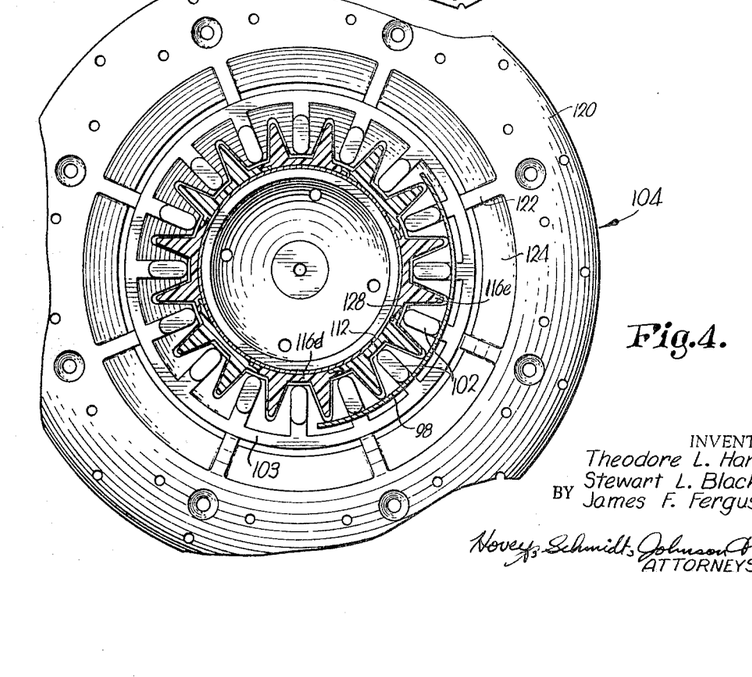
FIG. 4 is an enlarged, fragmentary plan of the ice breaker illustrated in elevation in FIG. 3, and also showing the harvesting element in section with the view being taken substantially on the line 4—4 of FIG. 3.

Sticks of ice formed in the elongated upright passages between projections 116e, and shifted upwardly by the segment 116b during reciprocation of element 108, are broken into chunks of suitable size by the breaker unit broadly designated 104. With reference to FIGS. 2, 3 and 4, annular, generally conical section 120 of unit 104 is integrally joined to cone 103 of unit 104, by respective radially disposed, circumferentially spaced connector webs 122 located between the opposed, complemental, parallel faces 124 and 126 of conical section 120 and cone 103 respectively. As is particularly evident in FIG. 2, the conical space between faces 124 and 126 and divided by webs 122 presents a series of individual passages which are at an angle with respect to the longitudinal axis of evaporator 28 and thereby harvester element 108. Webs 122 are strategically located as evident in FIG. 4, so as to be positioned between respective adjacent pairs of the projections 116e of harvester element 108. Tubular sleeves 125 joined to the underface of conical section 120 in alignment with each of the webs 122 serve as means for supporting unit 104 on an annular portion of plate 84 through the medium of fasteners 127 extending downwardly through respective sleeves 125. Fasteners 127 thereby also serve to secure the annular gasket 86 in upper disposition in surrounding relationship to the opening presented by inner flange section 84b of plate 84.

The cone 103 is provided with a series of depending, radially projecting, circumferentially spaced, generally transversely triangular, fingers 128 which are located between each adjacent pair of projections 116e of harvester element 108 as is best shown in FIGS. 2 and 3. The outwardly disposed surfaces of fingers 128 merge with the inclined faces 126 in complemental relationship with faces 124, so that as sticks of ice are shifted upwardly by harvester element 108, the individual sticks are caused to engage the inclined face 126 of a respective finger 128, and thereby be deflected through the passages between faces 124 and 126, into the receiver 100.

Mechanism for cyclically reciprocating element 108 is mounted on carrier plate 80 and broadly designated by the numeral 130. An elongated lead screw 132 is positioned in coaxial relationship with respect to cylinder 98 as well as element 108, is carried by sleeve 96 within bearing 88, and projects above the latter as shown in FIG. 2. The portion of lead screw 132 extending downwardly into cylinder 98 is of sufficient length to reciprocate harvester element 108 throughout the entire path of travel thereof. As best shown in FIG. 2, the portion of lead screw 132 projecting downwardly into cylinder 98 has a first helical groove 134 therein, twisted in one direction around the circumference of screw 132, as well as a second helical groove 136 twisted in the opposite direction from helical groove 134, but at a different pitch than the latter. The grooves 134 and 136 intersect each other around the circumference of screw 132, but because of the relative disposition thereof, operate to cause a follower therein to pass through the entire length of a respective screw before transferring to the next screw. Thus, the follower 138 on pin 140 carried within a suitable bore therefor in plug 114 at the upper extremity of sleeve 112, is caused to remain in one of the grooves 134 and 136 during rotation of screw 132 in one direction, until the follower 138 reaches the end of a corresponding groove whereupon it automatically transfers to the other groove and effecting movement of element 108 in the opposite direction. The groove 134 serves to shift element 198 upwardly during normal rotation of screw 132, while the groove 136 effects return of element 108 to the initial stand-by position thereof.

Referring to FIG. 2, it can be seen that means for mounting the lead screw 132 on carrier plate 80 takes the form of a washer 142 surrounding the main shaft of screw 132 and resting on an annular support 144 recessed in the inner surface of sleeve 96 adjacent the lower extremity thereof, as well as a ring 146 carried by screw 132, and a coil spring 148 interposed between washer 142 and ring 146. The annular retainer 150 resting against a downwardly facing shoulder on the upper end of screw 132, restricts ring 146 against movement away from washer 142.

A clutch unit broadly designated 152 is provided in surrounding relationship to the upper extremity of lead screw 132 for selectively driving the latter from the output shaft 154 of a prime mover assembly 156 carried by and depending from carrier plate 80. Assembly 156 includes an electric motor 158 having an output shaft (not shown) coupled directly to the input of a conventional step-down gear box 161 suitably secured to carrier plate 80 in disposition with the output shaft 154 thereof projecting upwardly through the carrier plate in parallel relationship to the axis of screw 132. The sprocket 160 coupled to output shaft 154 for rotation therewith is joined by chain link belt 162 to a sprocket 164 mounted on the upper extremity of sleeve 96 directly above bearing 88 and secured thereto by coupling pin 166.

The uppermost section 168 of lead screw 132 is cut away on opposite sides thereof to present two opposed flats and is received within a clutch member 170 having an upright bore 172 therein of configuration to complementally receive section 168, and located in direct overlying relationship to sprocket 164. The circumferentially extending skirt 174 of clutch member 170 has a pair of opposed, aligned notches 176 therein and adapted to receive corresponding, opposed, radially aligned, upstanding lugs 178 on the upper peripheral surface of sprocket 164. It is therefore to be appreciated that when the lugs 178 are located within corresponding notches 176, rotation of sprocket 164 by motor 158 effects rotation of clutch member 170 therewith.

Figure 5:
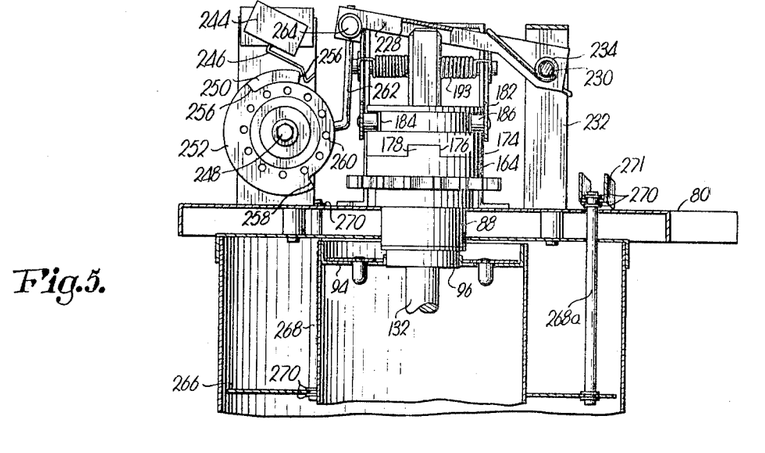
FIG. 5 is a fragmentary, vertical, cross-sectional view of the upper portion of the ice making apparatus illustrating the control mechanism operated by the drive shaft for the harvester element, taken substantially on the line 5—5 of FIG. 1, but with the upper lever arm and associated cams being shown in elevation for clarity.

Structure for controlling the disposition of clutch member 170 includes a support 180 mounted on carrier plate 80 and pivotally carrying a generally Y-shaped actuating arm 182 embracing clutch member 170 as shown in FIG. 5. Clutch member 170 has a groove 184 in the outer peripheral surface thereof which serves to receive opposed, inwardly extending components 186 carried by the inner surfaces of the leg portions of arm 182 which are located on opposite sides of groove 184. The extremity of arm 182 remote from support 180 is pivotally joined to the armature extension 188 of a control solenoid 190 mounted on an upright plate 192 between arm 182 and sprocket 160. A generally U-shaped spring 193 having an intermediate coil section surrounding the pivot shaft 194 swingably mounting arm 182 on support 180, normally biases arm 182 in a clockwise direction viewing FIG. 2, to maintain the clutch member 170 in operable interengagement with sprocket 164 during the period of deenergization of the coil of solenoid 190.

Solenoid 190 is also operable to open the dispensing door of assembly 72 as best illustrated in FIG. 2. Cylinder 74 is provided with an opening 196 therein adjacent the upper face of ice breaker unit 104 and which is normally closed by a door assembly 198 mounted for pivoting movement about a horizontal axis presented by pivot pin 200 carried by bracket structure 202 on the outer face of cylinder 74 and also extending through a pair of connector plates 204 projecting outwardly from door assembly 198. Rod 206 having a coupler 208 on the lower extremity thereof joined to plates 204 by a pin 210 reciprocable in lost motion slots 212 in plates 204, operates to effect swinging movement of door assembly 198 upwardly in response to lifting of the rod. Sleeve 214 retained on the upper extremity of rod 206 by suitable clip means has an extension 216 thereon which is connected to armature extension 188 by the same pivot pin 219 which joins arm 182 to extension 188.

Spring 218 around pivot pin 200 and engaging door assembly 198 as well as the outer surface of cylinder 74, operates to normally bias the door assembly 198 into the closed position thereof. Also, the coupler 208 is preferably of generally J-shaped configuration to permit the same to hook over the generally U-shaped bracket structure 202 when door assembly 198 is closed, to lock the door against opening notwithstanding pressure of ice thereagainst contained within receiver 100.

A transversely U-shaped chute 220 connected to cylinder 74, and underlying opening 196 as well as the door assembly 198, projects downwardly therefrom at an angle toward a station in spaced relationship from apparatus 20 to permit a required quantity of chunk ice to be delivered directly into the beverage cup forming a part of the vending machine receiving apparatus 20.

Figure 1:
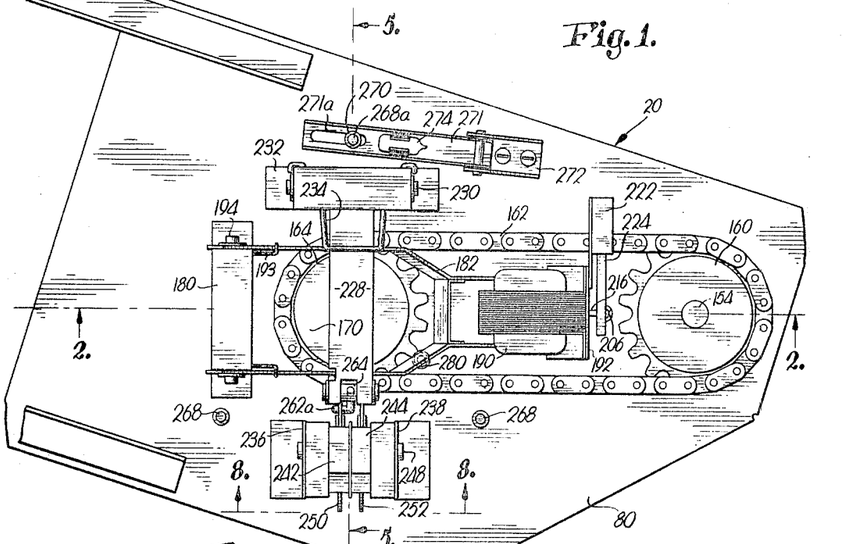
FIGURE 1 is a plan view of ice making apparatus especially adapted for use in a beverage vending machine, and constructed in accordance with the preferred concepts of the present invention.

The plate 192 also mounts a microswitch 222 having an actuator 224 which is controlled by a lever arm 226 mounted for pivoting movement directly above the upper extremity of rod 206 as illustrated in FIGS. 1 and 2. Upon raising of rod 206 by energization of solenoid 190, the upper end of rod 206 contacts lever arm 226 and shifts the latter upwardly through an arc to engage and shift the actuator 224 of switch 222, thereby changing the condition thereof.

Figures 7, 8:
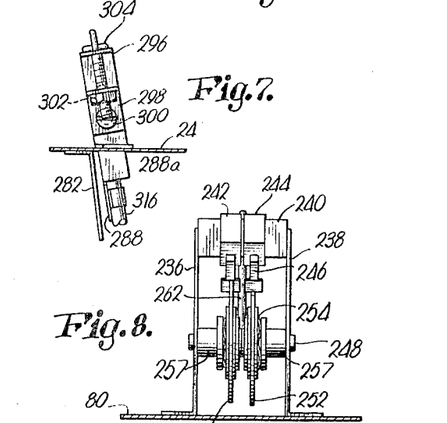
FIG. 7 is a fragmentary, vertical cross-sectional view taken substantially on the line 7—7 of FIG. 6 and looking in the direction of the arrows.
FIG. 8 is a fragmentary, vertical cross-sectional view taken substantially on the line 8—8 of FIG. 1 and looking toward the control cams and associated switches.
Figure 9:
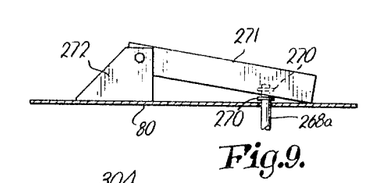
FIG. 9 is a fragmentary, side elevational view of the switch arm for the ice storage compartment full switch and illustrated in plan in FIG. 1.
Figure 10:
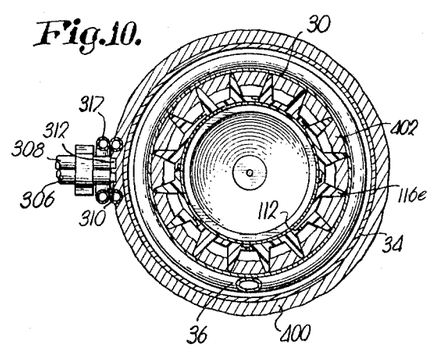
FIG. 10 is a fragmentary, horizontal cross-sectional view through the harvester element and evaporator, and showing the inner and outer ice coatings formed thereon during the cooling cycle of the refrigeration equipment and also illustrating the ice bank sensing mechanism operably associated with the evaporator.

Because of the spring mounting of lead screw 132 in sleeve 96, the lead screw under certain circumstances may shift with respect to the drive mechanism therefor, and the structure for sensing reactive longitudinal shifting of the lead screw 132 takes the form of an arm 228 overlying the upper extremity of section 168 of lead screw 132, and pivotally carried by a horizontal pin 230 mounted on the generally U-shaped support 232 alongside clutch member 170 and sprocket 164 as shown in FIGS. 1 and 5. The generally U-shaped spring 234 having an intermediate section around pin 230 on opposite sides of arm 228 normally biases the latter in a counterclockwise direction viewing FIG. 5 and thereby toward the upper extremity of section 168 of lead screw 132. Thus, longitudinal shifting of lead screw 132 effects pivoting movement of arm 228 against the bias of spring 234. A pair of parallel, upright, spaced plates 236 and 238 mounted on carrier plate 80 on the side of clutch unit 152 opposed to support 232, have a connector 240 therebetween serving to mount a pair of microswitches 242 and 244 provided with downwardly projecting actuators 246 which are in parallel spaced relationship as shown in FIG. 8. Shaft 248 spanning the distance between plates 236 and 238 carries a pair of cams 250 and 252 respectively which are aligned directly with the actuators 246 of corresponding switches 242 and 244. The cams 250 and 252 are in frictional interengagement on shaft 248 for simultaneous rotation thereon, although the spring washers 254 between respective cams 250 and 252, and the associated flanged spacers 257 permit relative rotation between the cams for adjustments.

The diameter of each cam 250 and 252 is reduced around the periphery thereof to a predetermined extent, thereby presenting outwardly directed cam shoulders 256 and 258 which join the peripheral margin of each cam of greatest diameter with the inner diameter cam surface. As is apparent in FIG. 5, the cam shoulder 256 of cam 250 is out of alignment with the corresponding shoulder 256 of cam 252. Thus, since the cam shoulders 256 engage the actuators 246 of switches 242 and 244 to change the condition of such switches, the point at which the switches are actuated during rotation of cams 250 and 252 differs and depends on the extent of rotation of the cams. The cams 250 and 252 are also provided with a series of openings 260 therein around the circumference of the same, and means for operably joining the cams to actuating arm 228 takes the form of a generally J-shaped rod 262 pivotally mounted on the outermost extremity of arm 228 through the medium of pivot structure 264 and having an extension 262a on the lower extremity thereof positioned in one of the openings 260 in cam 250. Thus, assuming the cams 250 and 252 are in the disposition illustrated in FIG. 5, upon downward reaction of the lead screw 132 the arm 228 will move downwardly under the influence of spring 234 and the rod 262 will be lowered to thereby rotate cams 250 and 252 in a clockwise direction. Actuation of only the switch 242, or both of the switches 242 and 244, will be dependent upon the degree of swinging movement of arm 228 and the corresponding rotation of cams 250 and 252.

Particulate ice level sensing mechanism within receiver 100 comprises an annular plate 266 freely reciprocable relative to cylinder 98 and carried by a series of upright, parallel rods 268 extending through closure 78 as well as carrier plate 80 as is evident in FIG. 5. Clips 270 on the upper and lower extremities of each of the rods 268 serve not only to support the annular plate 266 thereon, but to also limit downward movement of the plate within receiver 100 when the clips 270 engage the upper face of carrier plate 80.

The rod 268a (FIGS. 1 and 5) and having a pair of the clips 270 on the upper extremity thereof, is operably coupled to a channel member 271 pivotally secured to a U-shaped bracket 272 on the upper surface of carrier plate 80 adjacent support 232. The member 271 carries a mercury switch 274 therein positioned to effect opening of the contracts thereof when the channel member 271 is pivoted through a predetermined arc during elevation of plate 266 by increase in the quantity of ice stored in receiver 100. As shown in FIG. 1, the outer end of channel member 271 has an elongated slot 271a therein accommodating the upper end of rod 268a to permit free swinging movement of channel member 271 about the axis of pivoting movement thereof as plate 266 and thereby all of the rods 268 are raised by ice accumulating in the receiver 100.

Another annular plate 276 located within cylinder 98 above plate 94, has a series of lugs 278 thereon which project through suitable openings therefor in plate 94 as is evident in FIG. 2. The lugs 278 are located directly above plug 114 so that when harvester element 108 reaches the uppermost end of its path of travel, the plate 276 is shifted upwardly to thereby also move the indicator 280 upwardly and thereby give a visual indication of the location of harvester element 108.

Figure 6:
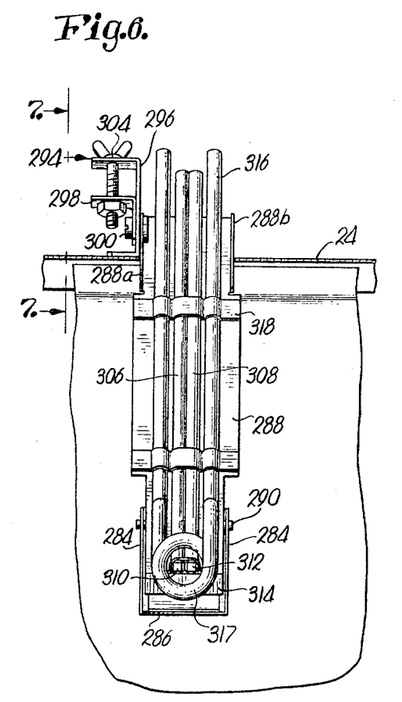
FIG. 6 is a fragmentary, vertical, cross-sectional view taken substantially on the line 6—6 of FIG. 3 and illustrating the ice bank sensing mechanism and the adjustment mechanism therefor.

Ice buildup control structure forming a part of apparatus 20 includes a hanger 282 secured to and depending from plate 24 within tank 22 adjacent receiver 44, and carrying a pair of opposed, upright plates 284 in turn secured to the outer face 56 of evaporator 28. The bottom plate 286 spanning the distance between plates 284 cooperates with the latter to define an open-top cup which in turn receives the lower extremity of a support member 288 provided with a cross pin 290 on the rear face thereof receivable in corresponding opposed, downwardly opening notches 292 in plates 284. The upper end of member 288 has outwardly bent tab portions 288a and 288b thereon. As is evident in FIG. 6 plate 24 has an opening therein clearing the upper extremity of support member 288, the portions 288a and 288b thereon, and other components to be described herein, mounted thereon, with the portion 288a being secured to adjustment mechanism broadly designated 294 and mounted on the upper surface of plate 24. Mechanism 294 includes a U-shaped bracket 296 carried by plate 24 adjacent the opening therein clearing member 288, and disposed with the bight thereof in an upright location. L-shaped bracket arm 298 located with one leg thereof against the inner surface of the bight of bracket 296, receives one end of a fastener 300 projecting through the bight of bracket 296 as well as portion 288a of member 288. By virtue of the provision of an elongated slot 302 in the bight of bracket 296, fastener 300 and thereby member 288 may be shifted longitudinally of bracket 296 to vary the disposition of the lower extremity of member 288 relative to the bottom plate 286 of the open-top cup hereinabove described. Bolt and nut means 304 extending through and interconnecting the outwardly disposed, parallel, spaced leg portions of bracket 296 and arm 298 permit selective retention of member 288 in any required disposition, limited only by the extent of slot 302.

A pair of conduits 306 and 308 secured to the face of member 288 proximal to evaporator 28 and extending substantially the fully length of member 288, are of generally J-shaped configuration as best shown in FIG. 3, and serve to carry the conductors leading to respective electrodes 310 and 312 projecting toward the outer face 56 of evaporator 28. As is evident in FIG. 3, the electrodes 310 and 312 are normally maintained in spaced relationship, terminate in equidistantly spaced relationship from the outer surface of evaporator 28, and are maintained a finite distance apart. Support is provided for the lower extremity of conduits 306 and 308 by a generally J-shaped bracket 314 connected to the lower end of member 288. By virtue of the inclination of notches 292 with respect to the longitudinal dimension of member 288, it can be seen that vertical reciprocation of member 288 and the components thereon has the effect of shifting electrodes 310 and 312 toward and away from the outer face 56 of evaporator 28 as the cross pin 290 rides in aligned notches 292 in plates 284. An electrical conduit 316 is also carried by member 288 for movement therewith, and is provided with a coiled resistance heating element 317 on the lower extremity thereof looped around electrodes 310 and 312 as shown best in FIGS. 3 and 6. The conduit 316 along with conduits 306 and 308 are secured directly to member 288 for movement therewith by a series of cross straps 318.

Figure 13:
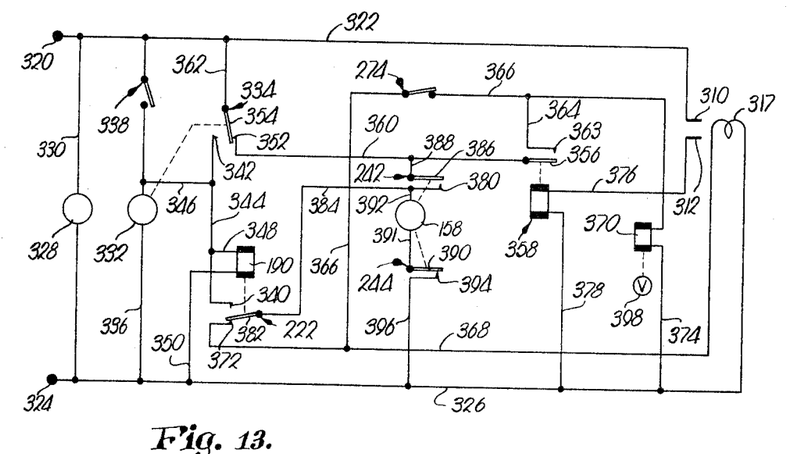
FIG. 13 is a schematic representation of the control circuit of the present apparatus and the interrelationship of the operating components of the control mechanism.

In the schematic diagram of the control circuit for apparatus 20, as illustrated in FIG. 13, the power line terminal 320 is joined directly to electrode 310 by line 322 while the other power terminal 324 is connected to one side of the resistance heating element 317 by line 326. The compressor motor 328 is interposed in a direct line 330 between lines 322 and 326 for continuous operation so long as power is supplied to terminals 320 and 324. Since apparatus 20 is especially adapted for use in a beverage vending machine as previously described, the schematic circuit illustrates a typical vending machine control arrangement in simplified form, and which therefore includes a cup dropper having a cam switch control motor 332. Although this motor does in fact control a number of functions of the cup dropping mechanism, only the switch 334 controlled by motor 332 and pertinent to the present apparatus is illustrated in FIG. 13. The cup dropper motor 332 is interposed in a line 336 between lines 322 and 326, which also includes the control vend switch 338 that closes only after deposit of proper money in the machine and normally, selection of a desired beverage by the customer. The contact 340 of switch 222 is joined to the contact 342 of cup dropper cam switch 334 by a line 344, while line 346 interconnects line 336 and line 344 between vend switch 338 and motor 332. One side of the coil of solenoid 190 is joined by line 348 to line 344, while the other side of the coil is coupled to line 326 by line 350.

The contact 362 of cup dropper cam switch 344 normally having the switch arm 354 in engagement therewith, is connected to the movable relay arm 356 of ice harvest relay 358 by a line 360. Line 362 couples line 322 to the switch arm 354 of switch 334. The normally open contact 363 of relay 358 is joined by line 364 to a line 366 having normally closed switch 274 therein and leading from a line 368 to one side of the coil of hot gas defrost valve solenoid 370. Line 368 serves to join the normally closed contact 372 of switch 222 to the other side of heating coil 317. The coil of valve control solenoid 370 is also joined to line 326 by a line 374.

The coil of control relay 358 is connected to electrode 312 by a line 376 and to line 326 by a line 378. The normally open contact 380 of cam controlled switch 242 is joined to the switch arm 382 of switch 222 by a line 384. The switch arm 386 and which is under the control of actuator 246 of switch 242, is joined to line 360 by line 388. The switch arm 390 of switch 244 under the control of actuator 246 of switch 244 is coupled to the field windings of motor 158 by line 391, while the opposite side of such windings are joined to line 384 by line 392. The normally closed contact 394 of switch 244 is coupled to line 326 by line 396.

The valve 398 under the control of solenoid 370 is interposed in the refrigerant line of apparatus 20 for directing hot gas into coil 36 via hot gas line 48.

Operation

It is initially assumed that tank 22 is filled with water to a predetermined level, that the ice harvesting element 108 is at the lowermost end of its path of travel with the shoulder 116g thereof in engagement with stop ring 118, and that refrigerant is being directed into the shell of evaporator 28 via feed line 38 and manifold structure 40. Pump 70 is also assumed to be operating to recirculate the water in tank 22. Water directed into the interior of evaporator 28 through elbow 50 flows upwardly between webs 116c into the passages defined by projections 116e and thence out of harvester 108 through the opening in plug 114. As heat is removed from the water in tank 22 and within the harvester passages by vaporization of the refrigerant, a layer of ice designated 400 in FIG. 10 begins to build up on the outer face 56 of evaporator shell 34, in association with formation of elongated, essentially stick ice segments designated 402 in FIG. 10 and separated one from the other by the projections 116e of ice harvester element 108. Continuous movement of the water over the inner surface 54 of wall 30 during freezing of ice sticks 402 contributes to production of relatively clear ice thereby resulting in a more desirable final particulate product. The ice layer formed on the inner and outer surfaces of evaporator 28 gradually increases in thickness as refrigerant is supplied to the shell 34.

The stand-by condition of the cotrol circuit is illustrated in FIG. 13 wherein the switch 274 is shown as being closed, indicating that the receiver 100 is not as yet filled with ice. Furthermore, in the initial stand-by operation, water contained in tank 22 surrounds electrodes 310 and 312 and provides an electrical path of sufficient conductance to cause the coil of relay 358 to be energized through a path including terminal 320, line 322, electrode 310, the water between electrodes 310 and 312, electrode 312, line 376, the relay coil, line 378, line 326 and terminal 324. So long as the coil of relay 358 remains in an energized condition, the relay switch arm 356 thereof is maintained out of engagement with contact 363. Thus, the solenoid 370 is maintained in a deenergized condition to preclude passage of hot gas through valve 398 and line 48 to coil 36 within the evaporator 28.

The compressor motor 328 runs continuously during this phase of the operation, but the cup dropped motor 332 remains deenergized as does solenoid 190 and motor 158.

As soon as the accumulation of ice on the outer face 56 of shell 34 presenting layer 400, reaches a point where it bridges across electrodes 310 and 312, the circuit to the coil of relay 358 is interrupted because of the difference in conductivity between ice and water initially surrounding the electrodes. The higher resistance of the ice causes the relay coil to drop out thereby resulting in engagement of arm 356 with contact 363 and resultant cycling of element 108 to harvest ice.

Closing of the switch of relay 358 effects energization of solenoid 370 through a path including terminal 320, line 322, line 362, closed switch 334, line 360, the closed switch of relay 358, line 364, line 366, the coil 370, line 374, line 326 and terminal 324. The valve 398 is opened upon energization of solenoid 370 thereby causing hot gas to be directed into the coil 36 within shell 34, via hot gas line 48, and thereby resulting in rapid melting of those portions of the ice sticks 402 adhering to the surface 54 of cylinder 30, thus providing for disengagement of the individual ice sticks from the evaporator.

Simultaneously with hot gas defrost of the evaporator, it is to be noted from FIG. 13 that the heater coil 317 is also energized through the closed switch of relay 358 by a circuit including line 364, line 366 having closed switch 274 interposed therein, line 368, the coil 317, line 326 and terminal 324. The coil 317 melts the ice in surrounding relationship to electrodes 310 and 312, and as soon as the ice has melted sufficiently to provide a water conductive path between the electrodes, the coil of relay 358 is again energized resulting in deenergization of solenoid 370 and closing of the hot gas bypass valve 398. It is to be appreciated that the period of time required for melting of ice from around the electrodes 310 and 312 is sufficient to permit disengagement of the ice sticks 402 from the inner surface 54 of cylinder 30 but is not of a magnitude permitting substantial melting of either the layer or ice 400 or sticks 402.

Figure 12:
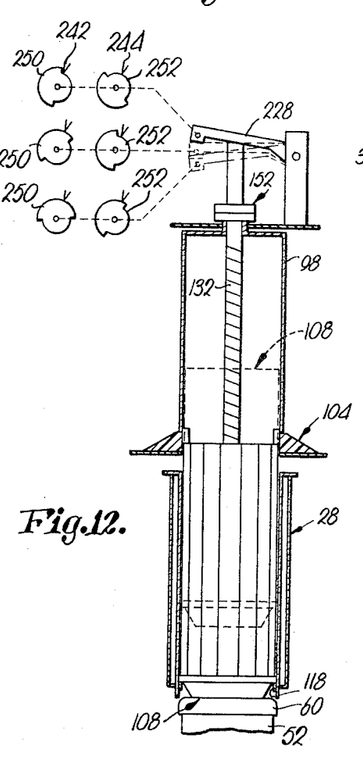
FIG. 12 is a diagrammatic view of the ice making mechanism, and illustrating the way in which the reaction of the drive shaft is used upon engagement of the harvester element with a solid object or material, to discontinue operation of the drive motor of the apparatus.

Returning to the period during which the switch of relay 358 is closed, it can also be seen that the motor 158 is energized through the closed switch of the relay by a circuit including line 364, line 366 having closed switch 274 therein, line 368, the closed switch 222, line 384, line 392, the field windings of motor 158, line 391, closed switch 244, line 396, line 326 and terminal 324. Operation of motor 158 effects rotation of lead screw 132 by virtue of the fact that solenoid 190 is in a deenergized condition thereby causing the clutch member 170 to be in operable interengagement with the sprocket wheel 164. The lead screw 132 is thereby driven in a counterclockwise direction viewing FIG. 2. Inasmuch as the normal stand-by positions of the lead screw 132 and harvester element 108 are substantially as shown in full line in the schematic representation of FIG. 12, wherein it can be seen that the arm 228 is deflected into the upper position thereof and the cams 250 and 252 are in the locations of the same illustrated in FIG. 5, the initial rotation of lead screw 132 has the effect of causing the latter to move downwardly relative to harvester element 108 and as coil spring 148 expands between washer 142 and ring 146. As arm 228 swings downwardly, viewing FIG. 5, during lowering of lead screw 132, the rod 262 is shifted downwardly to rotate cams 250 and 252 clockwise thereby effecting closing of switch 242 as indicated schematically in FIG. 12 by the dashed line position of arm 228. The closed switch 242 thereby provides a holding circuit for motor 158 to maintain the latter energized, notwithstanding opening of the switch of relay 358 upon reenergization of the coil thereof through electrodes 310 and 312.

Figure 11:
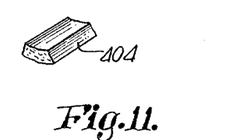
FIG. 11 is a perspective view of a chunk of ice of the general configuration formed by the apparatus of this invention.

During the run cycle of ice harvester 108, the follower 138 on plug 140 moves upwardly in groove 134 as lead screw 132 continues to rotate, thereby causing the harvester element 108 to move upwardly into the cylinder 98. During such upward movement of harvester element 108, the ice sticks 402, adhering to the opposed sides of projections 116e and also resting on the surface 116f, are shifted upwardly into the passages defined by opposed faces 124 and 126 of breaker element 104, whereby the individual sticks 402 are deflected out of the normal path of upward movement thereof, and resulting in breaking of the sticks 402 into individual chunks substantially of the configuration as shown in FIG. 11 and designated 404. The ice chunks 404 collect in receiver 100 and are agitated by rods 106 which are rotatable with cylinder 98 connected directly to rotatable sleeve 96.

When the ice harvester element 108 reaches the upper end of its path of travel, the follower 138 transfers to the groove 136 whereby continued rotation of the lead screw 132 in the same direction causes the harvester element 108 to move downwardly toward the initial disposition thereof. As soon as the shoulder 116g of finned member 116 engages the stop ring 118, lead screw 132 continues to attempt to force the element 108 downwardly, and since the harvester is restrained against further downward shifting, the lead screw 132 reacts upwardly against the action of coil spring 148 until arm 228 is shifted to the full line position schematically represented in FIG. 12, whereby the cams 250 and 252 are rotated counterclockwise through arcs to result in opening of switch 242 and consequent deenergization of motor 158.

The cycle described above is repeated until receiver 100 is filled with ice raising annular plate 266 to a level tilting mercury switch 274 through an angle to effect opening of the contacts thereof, whereby cycling of motor 158 as well as heater 317 is precluded.

In view of the fact that heater 317 is not energized when switch 274 is open, indicating a full ice storage compartment, the period of maintenance of valve 398 in an open condition is extended thereby resulting in substantial melting of ice sticks 402, and an inner portion of the layer 400, before the ice between electrodes 310 and 312 is melted to an extent to provide a conductive path between the electrodes. It is to be understood however, that a certain amount of the bank of ice on the outer part of evaporator 28 remains thereon at all times to provide efficient precooling of the water in tank 22.

It can also be recognized that if ice is not dispensed from receiver 100 and a certain amount of melt-down of chunks 404 occurs causing the switch 274 to reclose, the apparatus 20 will go through an ice making cycle as described above to replenish the ice which melts from receiver 100.

During a vend cycle of operation of the machine receiving apparatus 20, the vend switch 338 is momentarily closed upon proper deposit and selection of a desired beverage, whereupon the coil of solenoid 190 is energized via a path including terminal 320, line 322, line 336 having the momentarily closed switch 338 therein, line 346, line 344, line 348, the coil of solenoid 190, line 350, line 326 and terminal 324. The motor 332 of the cup dropper is also energized through line 336 at the same time. Upon energization of solenoid 190, the armature extension 188 thereof is retracted, thereby resulting in raising of arm 182 through an arc to decouple clutch member 170 from sprocket 164. Thus, the cylinder 98 having rods 106 thereon is rotated through sprocket 164, with the lead screw 132 remaining stationary. Energization of solenoid 190 also results in opening of door 198 through rod 206 connected to plates 204, with ice falling from receiver 100 directly into the beverage cup via chute 220.

The time period during which door assembly 198 remains open is controlled by the cup dropper cam driven by motor 332 and associated with switch 334. Upon commencement of operation of motor 332, the cam thereon shifts arm 354 into engagement with contact 342 thereby providing a holding circuit for the coil of solenoid 190. As soon as the cam on motor 332 reaches a position whereby the arm 354 may return to a position in engagement with contact 352, solenoid 190 is again deenergized thereby causing door assembly 198 to be returned to the initial closed position of the same under the influence of spring 218.

It is also to be pointed out that when solenoid 190 is energized to raise the door assembly 198, the upper extremity of rod 206 contacts actuator 224 to change the contacts of switch 222 and thereby provide a holding circuit for the motor 158 so long as switch arm 382 remains in engagement with contact 340. Therefore, upon deenergization of solenoid 190 as described above, the holding circuit for motor 158 is also interrupted and thereby resulting in discontinuance of rotation of cylinder 98 and the stirring rods 106 thereon. A required amount of the pre-cooled water in tank 22 is also directed to the beverage cup in association with a flavoring agent and the chunks of ice to make up the beverage product.

If the harvester element 108 is operating to harvest ice as previously described, at the time of a vend demand, motor 158 continues to operate to stir the ice and assure dispensing of a required quantity of ice to the beverage cup, but lead screw 132 ceases rotation during the vend cycle because of energization of solenoid 190 and consequent decoupling of clutch member 170 from sprocket 164. The harvesting cycle resumes operation as soon as the switch arm 354 of cup dropper switch 334 returns to the initial position thereof in engagement with contact 352.

At the beginning of an ice harvesting cycle, the harvester element 108 will be locked against movement until the ice sticks are released from the walls of evaporator 28. Thus, upon the initial attempt of lead screw 132 to shift the element 108 in an upward direction, the resistance to shifting movement of harvestor 108 causes a reaction of lead screw 132 downwardly into the dot-dash position thereof illustrated schematically in FIG. 12, whereby the cams 250 and 252 are rotated through an arc to effect opening of switch 244 and thereby deactivating the motor 158 to prevent damage to any of the components of the apparatus. Motor 158 will not cycle until lead screw 132 can return to a position permitting opening of switch 244. However, the hot gas defrosting of evaporator 28 will quickly free element 108 so that the latter may complete its cycle upon return of switch 244 to normal thereby effecting reenergization of motor 158. During upward movement of harvester 108, the ice sticks 402 therein as well as projections 116e block the annular space between plate 84 and flange 30a preventing flow of water over the top of evaportor 28. For this reason, harvester 108 is constructed to move away from gasket 60 during initial shifting thereof whereby an alternate path is established for water from pump 70 through the annular passage between gasket 60 and the lower extremity of evaporator 28. The water from elbow 50 thereby flows directly into tank 22 in by-passing relationship to evaporator 28 and the normal flow of water into the latter is not reestablished until harvester 108 returns to the standby position of the same.

It is also to be understood that the thickness of sticks 402 formed between projections 116e can be selectively varied as desired by the simple expedient of adjusting the disposition of electrodes 310 and 312 with reference to the outer face 56 of shell 34 and which is accomplished by vertical adjustment of member 288 within the cup defined by plates 284. The farther electrodes 310 and 312 are spaced away from face 56, the greater the amount of ice which must build up around evaporator 28 before the ice bridges electrodes 310 and 312 to deenergize relay 358.

Having thus described the invention what is claimed as new and desired to be secured by Letters Patent is:

1. Particulate ice making apparatus comprising:
   structure defining a generally cylindrical wall surface;
   means operably associated with said wall surface for cyclically cooling the latter to a first temperature level sufficiently low to freeze water thereon and then heating the wall surface to a second temperature above the freezing point of water;
   means for supplying water to be frozen to said wall surface;
   an element shiftable within said wall surface axially thereof to displace ice therefrom after freezing of the water on the wall surface and loosening of the ice from the wall surface as the temperature level thereof is increased from said first temperature toward said second temperature, said shiftable element being provided with spaced, radially extending projections thereon projecting toward and terminating proximal to the wall surface of said structure and cooperable therewith to define a series of water receiving channels whereby an elongated, individual ice stick is formed within each channel; and means within the path of said loosened ice sticks as the latter are shifted simultaneously by said element for changing the direction of movement thereof to break the ice into particles.

2. Apparatus as set forth in claim 1 wherein said element includes a cylindrical tube within the structure and coaxial with the wall surface thereof, mounting said radial projections thereon and provided with an annular flange adjacent one extremity thereof for shifting said ice sticks longitudinally of said wall surface.

3. Apparatus as set forth in claim 1 wherein the water supply means includes a receiver around said structure for holding a sufficient quantity of water therein to maintain at least a portion of the wall surface of said structure immersed in said quantity of water.

4. Apparatus as set forth in claim 3 wherein said structure includes an outer wall face disposed to remain at least partially immersed in said water and to be cooled by said cooling means whereby a bank of ice is maintained on said wall face of the structure to cool the water in said receiver.

5. Apparatus as set forth in claim 4 wherein is provided ice sensing means operably associated with said structure for sensing build-up of ice on said outer face thereof, and control means operably coupling the sensing means to said heating and cooling means for controlling cyclic operation to effect discontinuance of the cooling cycle of the same and to initiate the heating cycle thereof when ice has built up on said outer face of the structure to a predetermined thickness as sensed by said sensing means.

6. Apparatus as set forth in claim 5 wherein is provided means mounting the sensing means for selective movement toward and away from said outer face of the structure to permit selective control of the thickness of ice formed on the outer face of the structure as well as said wall surface thereof.

7. Apparatus as set forth in claim 5 wherein said heating and cooling means includes a refrigeration system having a compressor, an evaporator in thermal interchange relationship with said structure, and valve means regulating flow of refrigerant between the compressor and the evaporator, said control means includes an electrically operated device operably coupled to said valve means for opening and closing the latter and an electrical circuit for energizing the device, and said sensing means includes a pair of spaced electrodes interposed in said circuit in series relationship, immersed in said water and positioned adjacent said outer face of the structure in a location to cause ice formed on the outer face of the structure to ultimately bridge the electrodes and thereby interrupt supply of electrical energy to the device to control the cyclic operation of said refrigeration system.

8. Apparatus as set forth in claim 7 wherein said control means includes a heater in operable association with said electrodes for melting ice bridging across the electrodes and operable at the time of interruption of supply of electrical energy to said device.

9. Apparatus as set forth in claim 4 wherein said wall surface and the wall face of the structure are defined by a pair of spaced, coaxial walls located in fixed disposition within said receiver, said cooling means including a refrigerant coil wound around the inner wall between the latter and the outer wall.

10. Apparatus as set forth in claim 1 wherein said ice direction changing means includes a deflector having an ice engaging face located directly within the path of travel of the ice as it is shifted by said element and at an angle with respect to said path.

11. Apparatus as set forth in claim 10 wherein said structure is located with the wall surface thereof disposed substantially vertically, said element is reciprocable along a vertical path, the angularly disposed face of said deflector is positioned above the wall surface, and wherein is provided particulate ice storage means above the deflector for receiving and storing ice therein.

12. Apparatus as set forth in claim 1 wherein is provided means for shifting said element including an elongated, rotatable drive member, cyclically operable drive means coupled to said drive member for rotating the latter in one direction, and means joining the drive member to said element, said drive member being constructed and arranged to shift the element in a direction to displace ice from said surface during a first portion of the period of operation of the drive means and for returning the element to the initial stand-by position thereof during a remaining portion of said period of operation of the drive means.

13. Apparatus as set forth in claim 12 wherein is provided means operably connected to said drive means during normal cyclic operation thereof for deactivating the drive means during said first portion of the period of operation thereof upon the element encountering a resistance to its movement of predetermined magnitude.

14. Apparatus as set forth in claim 12 wherein said drive member comprises a rotatable shaft having a pair of helix grooves therein, said grooves extending around the shaft in opposite directions and said means joining the element to said drive means including a component on the element and extending into a proximal helix groove, said grooves being configured to cause said component to transfer from one helix groove to the other helix groove when the component reaches one extremity of a corresponding groove during rotation of the shaft by said drive means whereby the element is reciprocated by rotation of the shaft in said one direction.

15. Apparatus as set forth in claim 14 wherein is provided stop means positioned to block movement of the element oppositely from the direction of initial shifting thereof by said shaft and thereby defining the stand-by position of said element, and wherein is provided means operably coupled to said drive means for deactivating the latter after commencement of operation thereof when the element engages said stop means and in response to the resultant shifting of the shaft in a direction opposite to the direction of motion of the element when the latter engages said stop means.

16. Apparatus as set forth in claim 13 wherein said drive means comprises an electric motor operably coupled to said shaft for rotating the latter and said means for deactivating the drive means comprises a normally closed switch in series circuit relationship with said motor and cam means positioned to be operated by said shaft to open said switch when the element engages the stop means and the shaft is thereby caused to shift relative to the element.

17. Apparatus as set forth in claim 14 wherein said drive means comprises an electric motor operably coupled to said shaft for rotating the latter and wherein is provided means for deactivating the drive means during said first portion of the period of operation thereof upon the element encountering a predetermined degree of resistance to movement thereof and comprising a normally closed switch in series circuit relationship with said motor and cam means positioned to be operated by the downward reactive movement of the shaft to open the switch when the element encounters said predetermined resistance.

18. Apparatus as set forth in claim 14 wherein said drive means includes an electric motor, and wherein is provided hopper means positioned to receive particulate ice displaced from said wall surface of the structure by said element, an agitator in said hopper means for stirring the particulate ice therein, means coupling the agitator to said motor, selectively actuatable means operable to effect dispensing of a charge of particulate ice from the hopper means to a receiving station, clutch means operably coupling the motor to said shaft for rotating the latter, and means operable by said selectively actutable means and coupled to said clutch means for decoupling the shaft from said motor during the period of actuation of said selectively actuatable means.

19. Apparatus as set forth in claim 1 wherein said structure is disposed substantially vertically and the wall surface thereof is of generally cylindrical configuration, and said element includes a tube within the structure and coaxial with the wall surface thereof, and wherein is provided a receiver above the structure and presenting a generally cylindrical hopper positioned to receive particulate ice therefrom, a unit shiftably positioned in said hopper for sensing the level of particulate ice therein, and control means operable by said unit for maintaining the drive means and thereby said element in a deactivated condition when the ice reaches a predetermined level in the receiver as sensed by said device.

20. Apparatus as set forth in claim 19 wherein said unit includes an annular plate in said receiver, freely reciprocable therein and provided with means thereon positioned to operate said control means as the plate is moved upwardly to a predetermined level in the receiver by ice collecting therein.

References Cited by the Examiner

UNITED STATES PATENTS

| | | | |
|---|---|---|---|
| 2,317,624 | 4/1943 | Lindsey | 62—354 X |
| 2,650,479 | 9/1953 | Kattis | 62—354 X |
| 2,724,949 | 11/1955 | Kattis | 62—354 X |
| 3,049,894 | 8/1962 | Pichler et al. | 62—347 X |
| 3,059,450 | 10/1962 | Mueller et al. | 62—344 |
| 3,178,901 | 4/1965 | Backett | 62—352 X |

FOREIGN PATENTS 961,012   6/1964   Great Britain.

W. E. WAYNER, *Assistant Examiner.*

ROBERT A. O'LEARY, *Primary Examiner.*